(12) United States Patent
Cybulski

(10) Patent No.: US 6,870,489 B2
(45) Date of Patent: Mar. 22, 2005

(54) VEHICLE SENSING SYSTEM

(75) Inventor: Eric R. Cybulski, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 41 days.

(21) Appl. No.: 10/377,365

(22) Filed: Feb. 28, 2003

(65) Prior Publication Data

US 2004/0178930 A1 Sep. 16, 2004

(51) Int. Cl.$^7$ ................................................ G08G 1/01
(52) U.S. Cl. ........................ 340/933; 340/919; 340/916; 340/941; 361/686; 361/801; 361/724
(58) Field of Search ................. 340/993, 919, 340/916, 941; 361/686, 801, 724

(56) References Cited

U.S. PATENT DOCUMENTS

| | | |
|---|---|---|
| 2,360,732 A | 10/1944 | Smith |
| 3,249,915 A | 5/1966 | Koerner |
| 3,649,958 A | 3/1972 | Koerner |
| 3,714,626 A | 1/1973 | Koerner |
| 3,775,742 A | 11/1973 | Koerner et al. |
| 3,943,339 A | 3/1976 | Koerner et al. |
| 3,984,764 A | 10/1976 | Koerner |
| 4,032,096 A | 6/1977 | Perrault et al. |
| 4,449,115 A | 5/1984 | Koerner |
| 4,839,480 A | 6/1989 | Bickley |
| 4,939,512 A | 7/1990 | Dennison et al. |
| 4,943,805 A | 7/1990 | Dennison |
| 5,265,481 A | 11/1993 | Sonderegger et al. |
| 5,442,136 A | 8/1995 | Allen |
| 5,486,820 A | 1/1996 | Chatigny et al. |
| 5,491,475 A | 2/1996 | Rouse et al. |
| 5,520,056 A | 5/1996 | Buisson et al. |
| 5,850,192 A | 12/1998 | Turk et al. |

FOREIGN PATENT DOCUMENTS

| | | |
|---|---|---|
| DE | 24 37 797 | 2/1976 |
| DE | 26 48 287 | 4/1978 |
| GB | 885 372 A | 1/1961 |

*Primary Examiner*—Daniel Wu
*Assistant Examiner*—Tai Tan Nguyen
(74) *Attorney, Agent, or Firm*—James V. Lilly

(57) ABSTRACT

A reusable mechanical fastening means for a vehicle monitoring system facilitates maintenance and repair of the system. A plurality of carrier sections are connected together by clips. The clips have release tabs to move prongs against a spring force, thereby making the clips manually detachable. Vehicle sensing probes have interference ridges which mate with probe openings in the carrier sections. The carrier sections have open bottoms, and the worker can overcome the locking force of the interference ridge by turning the carrier section over and pressing on the probe through the open bottom. The clips can be attached on multiple planes relative to the carrier sections, minimizing torsional play within the extended support train. The clips and carrier sections are also easily manufacturable.

21 Claims, 8 Drawing Sheets

VEHICLE SENSING SYSTEM

BACKGROUND

The present invention relates to the field of sensing vehicles, and, more particularly, to structures used underneath roads to sense vehicles traveling on such roads, and to methods of maintaining those structures.

Methods and devices for detecting the presence of vehicles on a street or road are well known. Detecting the presence of a vehicle is done for a variety of reasons. Vehicles may be detected to monitor the traffic flow and determine road usage. This information may be utilized for transportation planning and traffic light control. Pairs of the sensing devices spaced apart along the roadway may also be utilized to monitor vehicle speeds.

Prior art vehicle detection devices include U.S. Pat. No. 3,984,764, U.S. Pat. No. 3,943,399, U.S. Pat. No. 4,449,115, and U.S. Pat. No. 5,491,475, all of which, if installed after the roadway is in place, require cutting into the pavement. Such cutting into the pavement has numerous downsides, further explained in U.S. Pat. No. 5,850,192 at Column 1, lines 18–57, which lines are incorporated herein by reference. The system of U.S. Pat. No. 5,850,192 includes attachable sections placed into an under-roadway conduit. The preferred sections are substantially rounded to be self-centering and may be weighted to maintain the probes in a substantially vertically oriented position. The original commercial implementation of the system of U.S. Pat. No. 5,850,192 included a clip attached to a carrier from above using blind rivets and washers.

However, the system of U.S. Pat. No. 5,850,192 left several shortcomings. The system of U.S. Pat. No. 5,850,192 is difficult to assemble due to inherent design constraints. For instance, installers can attach adjacent carriers of the original system together without creating a secure positive mechanical lock, and the connected carriers can become inadvertently detached during installation. If an installer does accomplish a positive attachment of adjacent carriers, then disassembly for maintenance and repair can be quite difficult. The system of U.S. Pat. No. 5,850,192 is expensive to manufacture. In particular, secondary operations in the original carrier design cannot be completed inline, but rather must be performed separately to the individual carrier units. Secondary operations include punching holes and slots into the carrier for the carrier clip, sensor, and the mating tongue piece of another carrier clip. Performing the secondary operations separately and offline decreases production efficiency, decreases accuracy between features, and increases costs. The present invention particularly improves upon the system disclosed in U.S. Pat. No. 5,850,192, as well as other problems associated with underground vehicle sensing systems.

SUMMARY

This invention is a reusable mechanical fastening means for a vehicle monitoring system. The system particularly allows for maintenance and repair in a safe and timely manner. The system includes a plurality of carrier sections connected by clips. In one aspect, the clips have release tabs to move prongs against a spring force thereby making the clips manually detachable. In another aspect, vehicle sensing probes are connected to the carrier sections with interference ridges, the carrier sections have open bottoms, and the installation worker can overcome the locking force of the interference ridge by turning the carrier section over and pressing on the probe through the open bottom. The clips can be attached on multiple planes relative to the carrier sections, minimizing torsional play within the extended support train. The clips and carrier sections are also easily manufacturable.

BRIEF DESCRIPTION OF THE DRAWINGS

Referring now to the drawings, wherein like reference letters and numerals indicate corresponding structure throughout the several views.

While the above identified FIGS. 1–10 set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principals of this invention.

DETAILED DESCRIPTION

Figure 1:
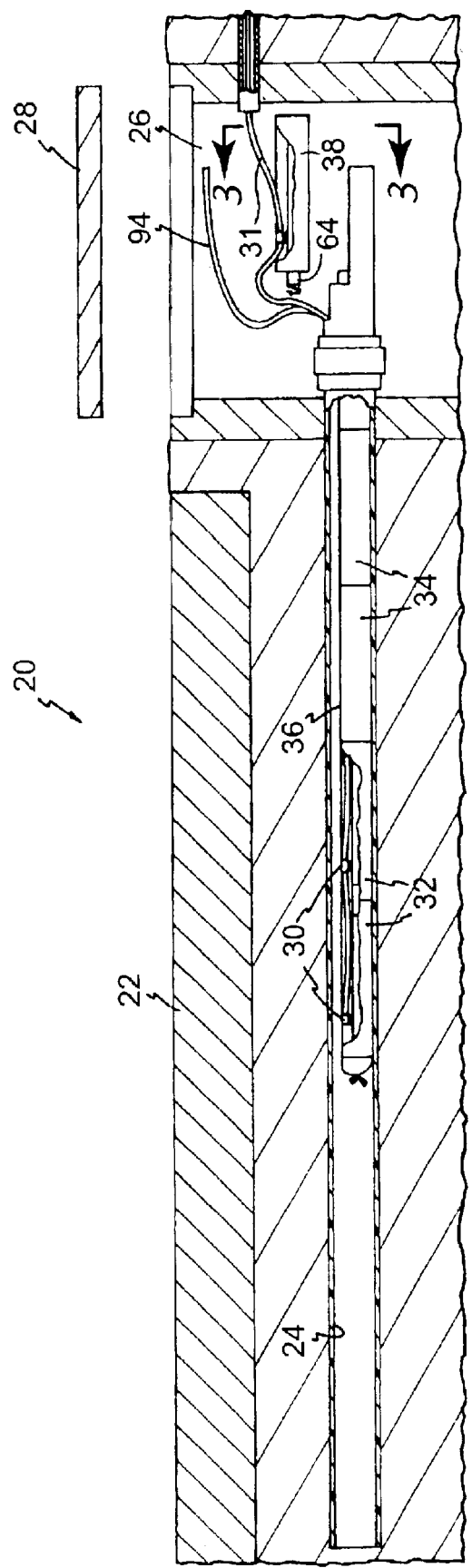
FIG. 1 shows a partially broken away side sectional view of a first embodiment of a vehicle sensing system according to the principles of the present invention.
Figure 2:
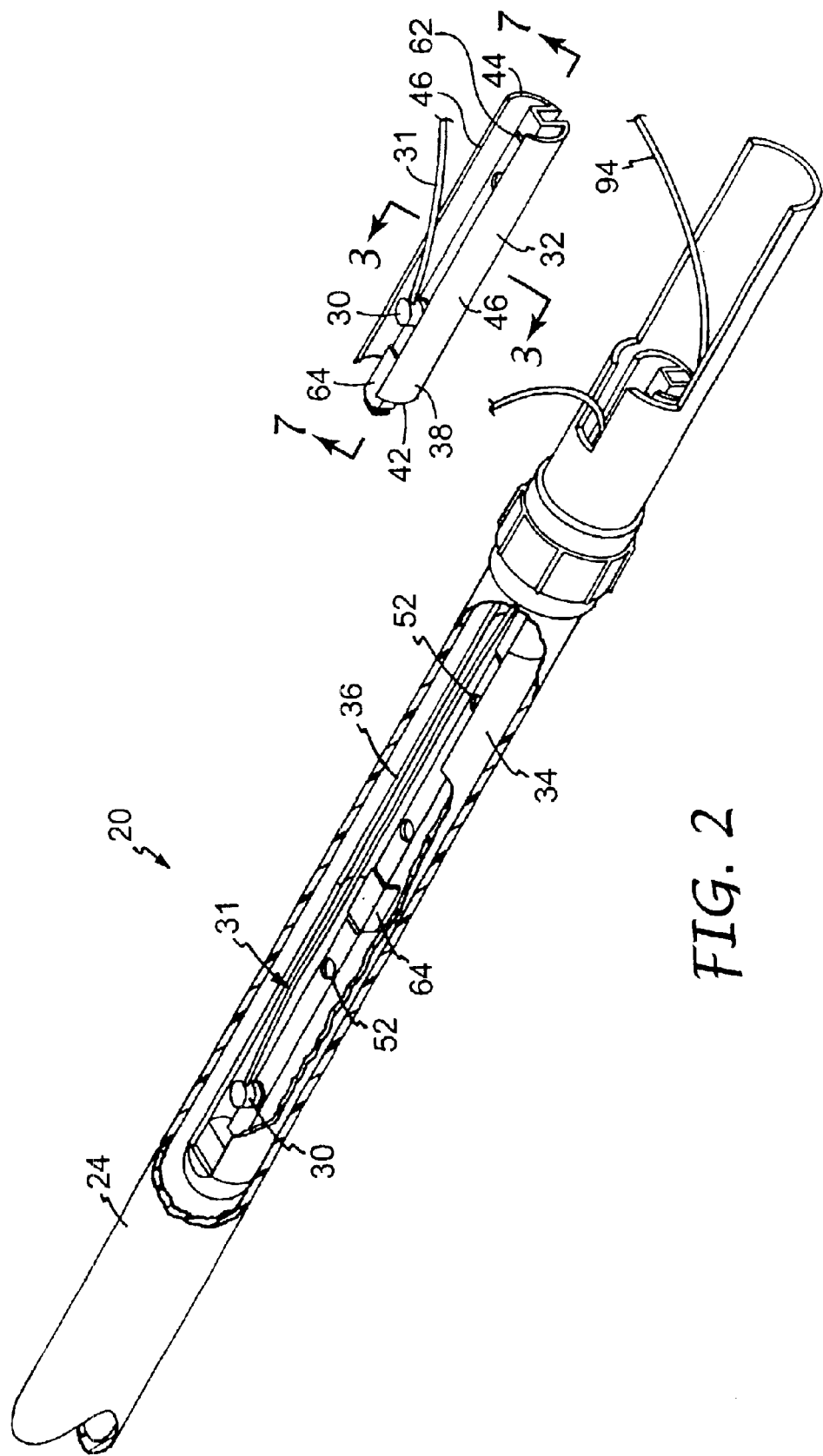
FIG. 2 shows a partially broken away perspective view of a portion of the vehicle sensing system shown in FIG. 1.

Referring now to the drawings, and in particular to FIGS. 1 and 2, there is shown a below ground vehicle sensing system, generally designated 20. In many respects, the vehicle sensing system 20 is similar to the vehicle sensing system disclosed in U.S. Pat. No. 5,850,192 in particular at Col. 3, line 54-Col. 4, line 55, Col. 5, lines 3–10, Col. 6, lines 9–22, and Col. 6, line 63-Col. 7, line 45 which lines are incorporated herein by reference. The vehicle sensing system 20 generally is positioned below a vehicle travel surface or roadway 22, normally pavement such as concrete or asphalt, and typically at a depth of 16 to 24 inches below the upper surface of the roadway 22. In a preferred embodiment, a bore or conduit 24 extends horizontally under the roadway 22 from a surface access hole 26, commonly referred to as a hand hole, at the side of the roadway 22. The hand hole typically includes a cover 28 to protect the wiring, electronics and other elements of the vehicle sensing system 20.

The sensing system 20 includes one or more sensor probes 30. The probes 30 may be as disclosed in U.S. Pat.

No. 5,850,192, or may sense the presence of vehicles traveling above over the roadway 22 through other means. Multiple probes 30 may be daisy-chain connected by cable 31, each probe 30 may have a separate cable 31, or each probe 30 may transmit without cable to a processor or controller. When the probe 30 senses the presence of a vehicle, a signal is sent to the processor or other control system (not shown) for processing, such as traffic light control or other traffic analysis.

To function properly, the preferred probes 30 should be aligned in a substantially vertical orientation, or at least within 10° of vertical. Satisfactory performance may be achieved when the probe 30 is within 45° of vertical, but the efficiency and accuracy of the probe 30 tends to decrease when tilted substantially away from vertical or away from the preferred design position.

Figure 3:
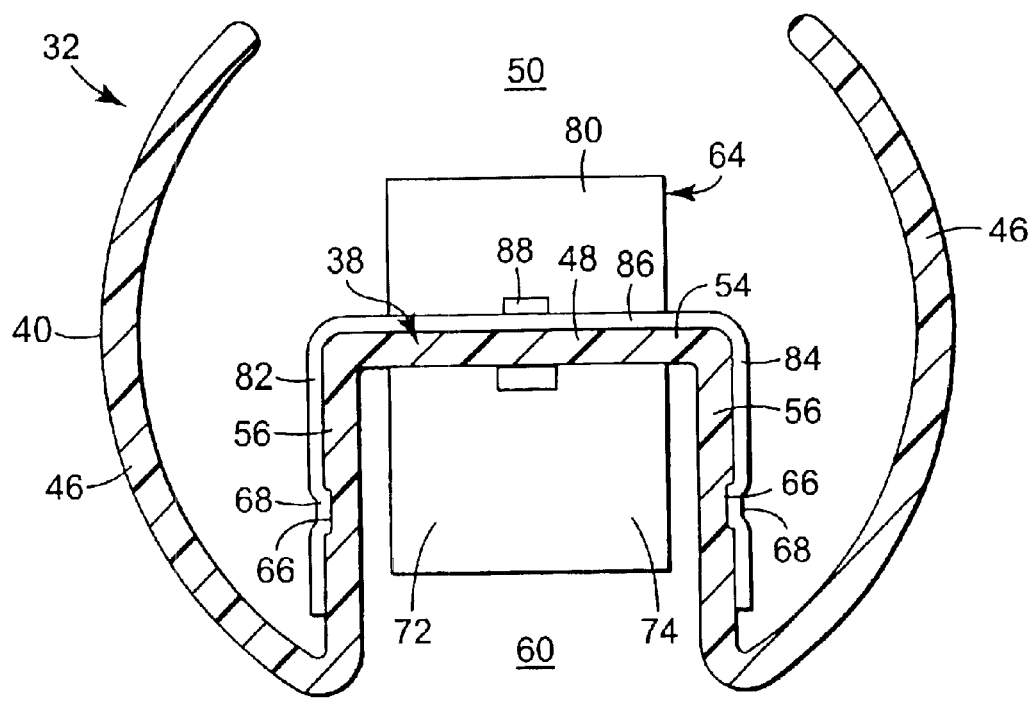
FIG. 3 shows a cross-sectional view of a probe carrier support section taken along lines 3—3 of FIGS. 1 and 2.
Figure 8:
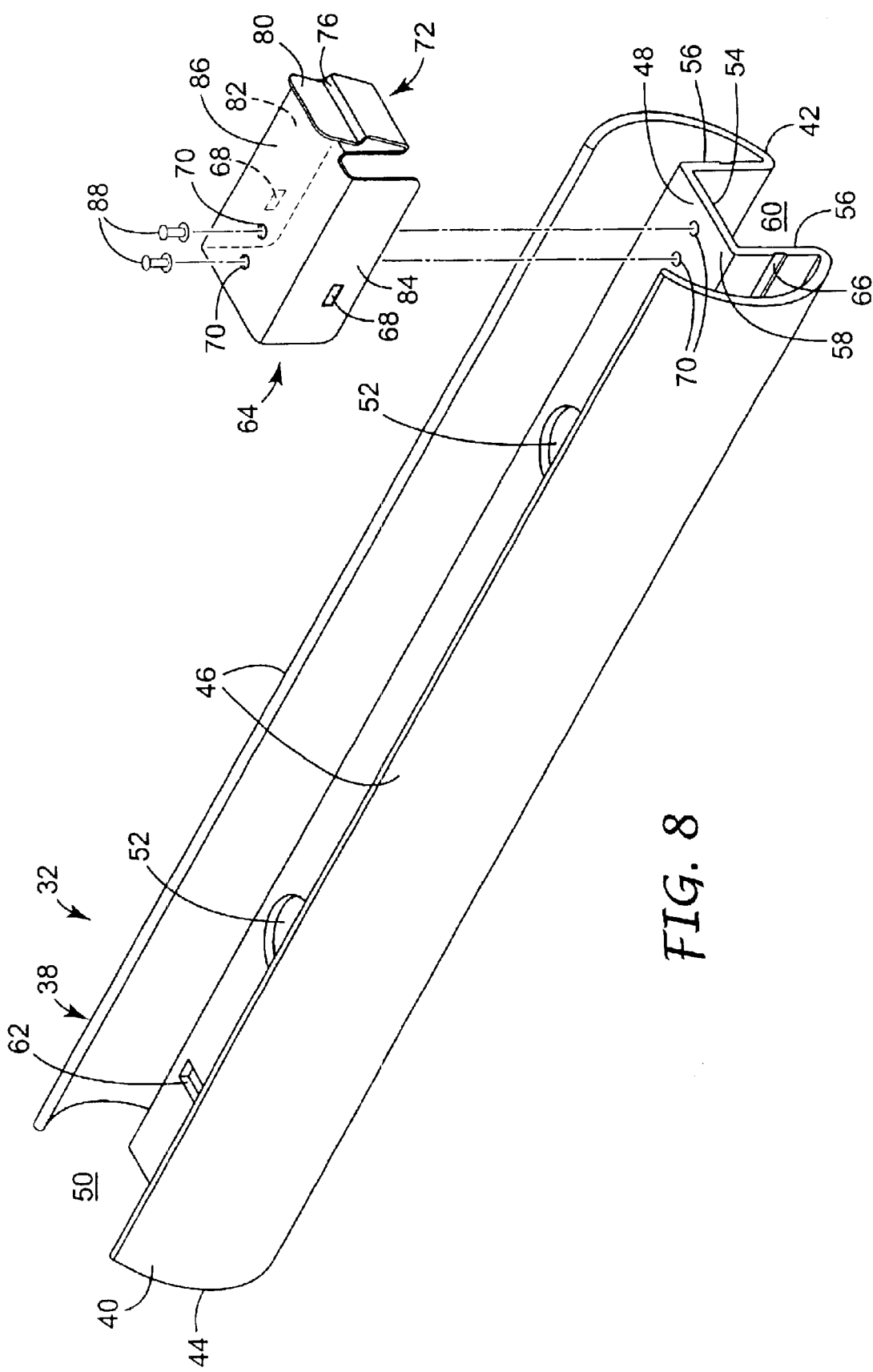
FIG. 8 shows an exploded perspective view of rivet attachment of a probe carrier support section and connector clip, showing a second embodiment of a connector clip according to the principles of the present invention.
Figure 10:
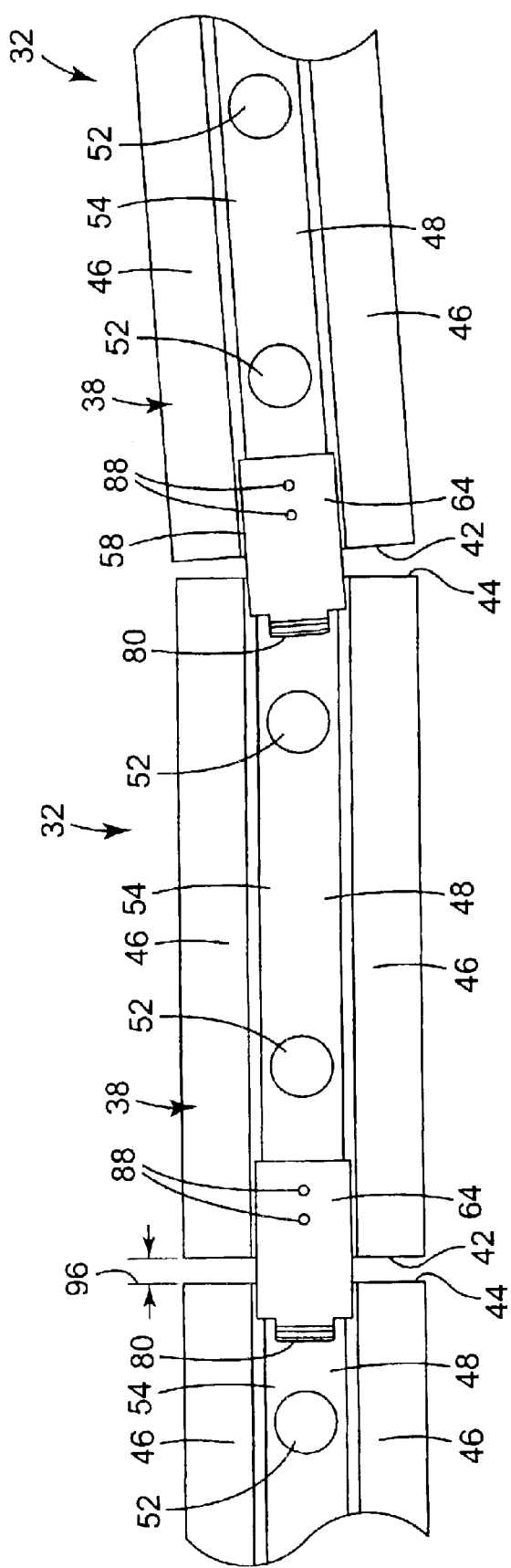
FIG. 10 shows a plan view of several field assembled carrier sections.

As shown in FIGS. 1 and 2, each probe 30 is housed in a probe carrier support section 32 which is further detailed in FIGS. 3, 8 and 10. The probe carrier support section 32 supports and holds the probe 30 in alignment. The probe carrier support section 32 also protects the probe 30. The system 20 also includes a plurality of spacer sections 34, which are used to position the probe carrier support section (s) 32 holding the probe(s) 30 in the desired transverse position relative to the roadway 22. A plurality of the spacer sections 34 are connected with probe carrier support sections 32 to form an extended support train 36 housing one or more probes 30 in spaced apart relationship. In the preferred embodiment, the spacer sections 34 are constructed identically to the probe carrier support sections 32, and the term "carrier section 32" will be used herein to refer to such sections 32, 34 regardless of whether a probe 30 is being held by the carrier section 32 or not. Constructing all the carrier sections 32 identically reduces the number of different parts in the system 20, increases the interchangability of parts, and increases flexibility in positioning the probes 30. Alternatively, different connector sections or connector material or other intermediate structures may be used as spacer sections between probe carrier support sections as taught in several of the embodiments of U.S. Pat. No. 5,850,192.

As best shown in FIGS. 3 and 8, each of the carrier sections 32 includes a carrier body 38 preferably with a cylindrical outer profile 40 which is sized for insertion into the conduit 24. The carrier body 38 is substantially rigid and runs longitudinally from one end 42 which is intended to be a leading end to an opposing (trailing) end 44. The carrier sections 32 each are made up of two rails or runners 46 on the sides of a frame or mounting portion 48 with an open top portion 50. Both the left runner 46 and the right runner 46 are formed with an arcuate outer shape to provide the rounded outer profile 40. The rounded or curved nature of the outer profile 40 helps to self align each carrier section 32 within the conduit 24. The low center of gravity for the carrier section 32 biases the carrier sections to naturally achieve proper orientation. The mounting portion 48 or lower portion of the carrier section 32 may be weighted to further stabilize the carrier section 32 and assist in orienting the probe 30 in a substantially vertical stable position.

The mounting portion 48 between the two runners 46 includes orifices or probe mounting holes 52 for receiving and aligning the probes 30, as shown on FIGS. 1 and 2. The mounting portion 48 includes a horizontal wall 54 extending between the left runner 46 and the right runner 46, with both the left runner 46 and the right runner 46 extending both above and below the horizontal wall 54. In this way, the horizontal wall 54 supports the probe 30 in a protected configuration so the probe 30 is supported in a central, sheltered position in the conduit 24. The mounting portion 48 includes two generally planar, upright vertical walls 56 and the horizontal wall 54 running between the vertical walls 56. The planar nature of the vertical walls 56 make them quite strong and robust to withstand years of use, with changes due to environmental and weather conditions, without gravitational sagging, warping, deflection or degradation which may cause a sensor probe 30 to come out of alignment. In the preferred embodiment, each of the right and left runners 46, the vertical walls 56 and the horizontal wall 54 are formed at a thickness of about 0.100 inches, extending for a section length of about 12 inches. The curvature of the runners 46 defines an outer diameter for the cylindrical outer profile 40 of about 1.2 inches.

The (leading) end 42 of the carrier body 38 includes a clip attachment area 58 preferably provided by a leading, clip abutment portion of the vertical walls 56 and the horizontal wall 54. The open top portion 50 permits access to the clip attachment area 58 from above. The carrier body 38 has an open bottom 60 which permits access to the underside of the clip attachment area 58 from below.

The horizontal wall 54 of the mounting portion 48 could include a single mounting hole. More preferably the horizontal wall 54 includes two or more probe mounting holes 52 in spaced apart relationship so that the spacing of the probes 30 may be varied to accommodate probe spacing specifications. During assembly and use, the open top portion 50 receives a portion of the probes 30 mounted in mounting holes 52, and also receives the runs of cable 31. The open bottom 60 of the carrier body 38 permits access to the mounting holes 52 from below and permits access to any probes 30 extending through the mounting holes 52 from below.

The horizontal wall 54 of the mounting portion 48 includes a clip recess or opening 62 formed toward the (trailing) end 44, with a connector clip 64 attached to the other (leading) end 42. While the clip recess 62 could be formed in any trailing portion of the carrier body 38, it should be placed to properly align and mate with the connector clip 64.

The mounting portion 48 includes two recessed retention grooves 66, one in each of the vertical walls 56. In the preferred embodiment, the recessed retention grooves 66 run the full length of the carrier section 32, measuring 0.020 inches deep (i.e., 20% of the wall thickness) by 0.105 inches in height. The recessed retention grooves 66 can be used to secure a metal connector clip 64 or sensor probe 30 in place without using any tools or adding additional parts such as screws, washers, or nuts, and punching. Avoidance of screws, washers and nuts as well as minimizing further manufacturing steps such as punching not only reduces manufacturing costs, but also prevents accidental damage to the inside of the mounting portion 48. The retention grooves 66 are squared off so as to more tightly mate with side tabs 68 of the connector clip 64.

The open cross-sectional top area 50 of the carrier body 38 is larger than in the original design of U.S. Pat. No. 5,850,192. This larger open top area 50 more easily holds and protects the cables 31. The larger open cable run area 50 also allows longer runs to be installed because more sensor probes 30 and accompanying cables 31 can be protected inside the carrier section 32.

The preferred method of manufacturing the carrier sections 32 is through extrusion of a plastic material. Each body 38 has a consistent cross-sectional shape throughout its length, which facilitates extrusion. As an extrusion, the outer runners 46 and the mounting portion 48 are integrally formed as a single element. Alternatively, the runners 46 and the mounting portion 48 may be attached in other ways. The plastic material is substantially rigid, and the cross-sectional shape helps to provide additional rigidity, particularly against torsional deflection when torqued about a longitudinal axis. The plastic material resists corrosion and is rugged and robust. Because the carrier sections 32 have a generally consistent cross-sectional shape, plastic extrusion can be accomplished at relatively low cost. The preferred plastic is a high modulus material, and most preferably rigid PVC or ABS.

The openings 52 for the sensor probe 30, as well as any rivet openings 70, can then be added in a secondary operation, such as machining or more preferably punching into the extrusion. The straight vertical walls 56 of the mounting portion 48, with no undercut, absorb the stress of the punching operation much better than the prior art design. The open bottom 60 of the mounting portion 48 also permits bottom access during the punching operation, to better support the mounting portion 48 during punching. Stress and damage to the extrusion during the punching process are therefore largely avoided. Greater locational accuracy for the punching operation can also be obtained in a jig by aligning the two rails of the carrier section 32 relative to the jig and having access through the open bottom 60 to the underside of the mounting portion 48. With the design of the present invention, the secondary operations are relatively simple, and can be completed inline with the extrusion.

Figure 4:
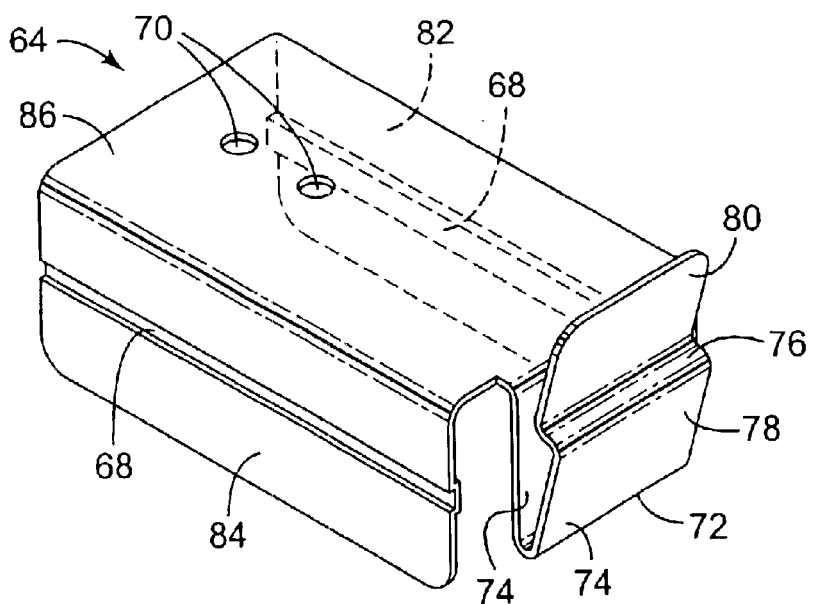
FIG. 4 shows a perspective view of the connector clip of FIGS. 1–3.
Figure 5:
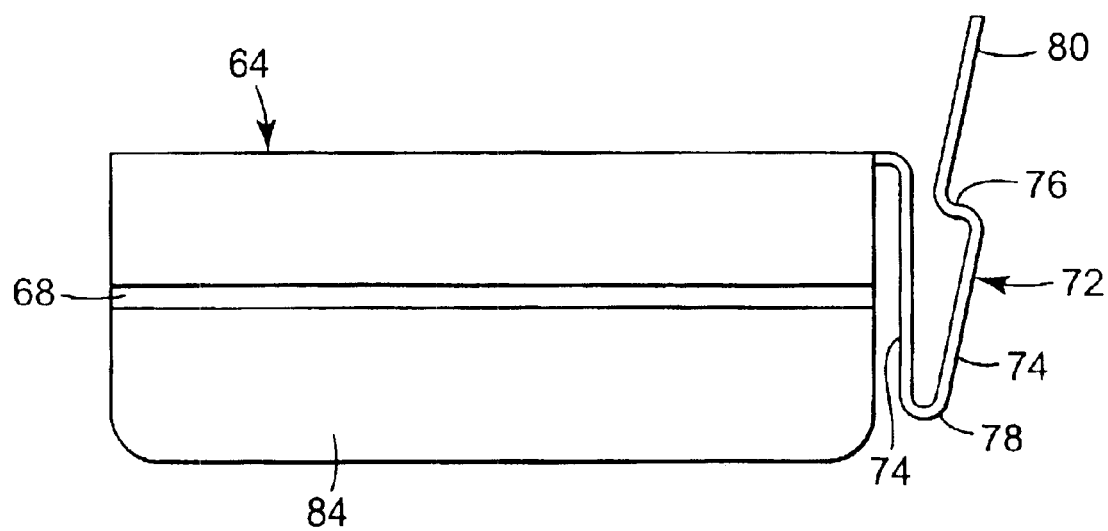
FIG. 5 shows a side view of the connector clip of FIGS. 1–4.

Each carrier section 32 includes a connector clip 64 which mounts at one end 42 of the carrier body 38. As shown in FIGS. 1, 2, and 10, the connector clip 64 attaches to the next adjacent section 32 to hold the carrier sections 32 in a connected arrangement and angularly aligned. As best shown in FIGS. 4 and 5, the connector clip 64 includes a retaining section or prong 72 which engages the clip recess or slot 62 formed in the preceding carrier section 32. The prong 72 extends beyond the (leading) end 42 of the carrier body 38 for a distance slightly greater than the distance that the clip recess 62 is removed from the (trailing) end 44 of the carrier body 38. In the preferred embodiment, the clip recess 62 is removed about 1.00 inches from the (trailing) end 44 of the carrier section 32, and the connector clip 64 is positioned so the prong 72 extends 1.10 inches from the (leading) end 42 of the carrier section 32, thereby maintaining a separation of about 0.10 inches between adjacent aligned carrier bodies 38 connected by the connector clip 64. Of course, the designed 0.10 inch separation is subject to manufacturing tolerances, which tolerances should be sufficiently tight so there is never an overlap or negative separation between attached adjacent aligned carrier bodies 38.

The connector clip 64 includes a positive mechanical locking feature, best shown in FIG. 5. The width of the prong 72 is defined by two opposing spring legs 74. The spring legs 74 have a shoulder 76 which defines an uncompressed spring width which is greater than the width of the clip recess 62. In the preferred embodiment, the clip recess 62 has a width of 0.200 inches, while the uncompressed width of the spring legs 74 at the shoulder 76 is 0.274 inches. The spring legs 74 compress together to a minimum width of 0.178 inches. The outer spring leg 74 provides a downwardly directed ramp surface 78 which extends at a ramp angle of 14° to vertical. When the prong 72 is pushed downward into the clip recess 62, the ramp surface 78 causes the recess wall to gradually increase its force and press the outer spring leg 74 toward the inner spring leg 74, decreasing the width between spring legs 74 to a value less than the 0.200 inch opening of the clip recess 62. Once fully inserted, the outer spring legs 74 snaps into position with a tactile click to secure the connector clip 64 into the clip recess 62. The spring force and shoulder 76 then positively holds the connector clip 64 in place, and thus secures the carrier sections 32 together.

The connector clip 64 is designed with a quick release thumb tab 80, best shown in FIG. 5. The term "thumb tab", as used herein, refers in general to a size adequate to allow manual hand depression, without the use of a tool, by a workers thumb or fingers. In the preferred embodiment, the thumb tab 80 is appropriately sized for manual hand depression by having an exposed width of at least 0.20 inches and an exposed height of at least 0.20 inches, with the most preferred size being a width of 0.75 inches and extending about 0.40 inches above the horizontal wall 54 of the mounting portion 48. The quick release tab 80 can easily be activated to detach the carrier sections 32 in the field without the use of tools. Easy detachment and removal of the carrier sections 32 is particularly important during the maintenance and repair periods. Each connector clip 64 needs to readily detach from the preceding carrier section 32 to facilitate removal, such as in the event that there is a malfunction in a sensor probe 30 which is used to sense the flow of traffic.

The connector clip 64 includes a left body abutment wall 82, a right body abutment wall 84, and a horizontal body abutment wall 86 extending horizontally and integrally connected between the left body abutment wall 82 and the right body abutment wall 84. The left and right body abutment walls 82, 84 can include side tabs 68 sized and spaced to mate with the retention grooves 66 of the carrier sections 32. The side tabs 68 can run the entire length of the abutment walls 82, 84 as shown in the preferred embodiment of FIG. 4. Alternatively, the side tabs 68 can run only a portion of the connector clip length as shown in the embodiment of FIG. 8. Another alternative configuration of side tabs 68 could be two shorter tabs on each side instead of one longer tab on each side.

If desired, the connector clip 64 can be manufactured integrally with the carrier body 38. However, the preferred embodiment separately forms the connector clips 64 of a different material and a different process than the extruded plastic carrier bodies 38. In a preferred embodiment, the connector clip 64 is a corrosion resistant metal material, such as 300 series stainless steel, annealed. When formed of steel, the connector clip 64 can be stamped and folded from 0.032 inch thick sheet steel, which provides an acceptable spring force for the prong 72 and can satisfactorily transmit torsion and pull forces between attached carrier sections 32. When formed of metal, the side tabs 68 which extend less than full length can be half-shear tabs or triangular tabs which pierce into the carrier body 38. Alternatively, the connector clips 64 could be molded out of plastic.

Assembly of the connector clip 64 to the carrier body 38 is simpler and less costly than the prior art. The connector clip 64 is placed onto the clip attachment area 58 from above. The side tabs 68 of the preferred connector clip 64 mate with longitudinal grooves 66 on the carrier section 32, such that the right body abutment wall 84 of the connector clip 64 is attached to the right vertical wall 56 of the carrier body 38 and the left body abutment wall 82 of the connector clip 64 is attached to the left vertical wall 56 of the carrier body 38. By connecting the connector clip 64 to the carrier body 38 on multiple surfaces and in multiple planes, the side tabs 68 serve several purposes. First, the side tabs 68 prevent any up or down movement of the connector clip 64 relative to the carrier body 38. Second, the side tabs 68 also add strength to the abutment walls 82, 84 of the connector clip 64 to allow for the clockwise and/or counter-clockwise twisting action to occur without damage to the assembly, such that the attachment between the connector clip 64 and the carrier body 38 minimizes rotational play between the connector clip 64 and the carrier body 38 about a longitudinal body axis.

If an even more secure attachment between each connector clip 64 and its carrier body 38 is desired, semi-tubular rivets 88 can be used, either in conjunction with or in place of the side tabs 68. With the carrier sections 32 formed of a high modulus PVC material and with access through the open bottom 60 to the bottom surface to which the rivets 88 are attached, conventional riveting can be used. Two washers which were used in the original commercial embodiment to help secure the connector clip on to the carrier section are eliminated. Access to the clip attachment area 58 from both above and below now facilitates fastening of the connector clip 64 to the carrier section 32 from above and below by using semi-tubular rivets 88. This has eliminated the need for using blind rivets and has eliminated the need for a washer to retain each rivet in place. When both tabs and rivets 88 are used, the tabs are preferably in the plane bisecting the rivets 88 thereby providing maximum in line support.

As an alternative to rivet attachment, the connector clip 64 can be formed with other tabs which are bent underneath the wall of the carrier extrusion during a secondary operation. Such an operation is possible again because the clip attachment area 58 is accessible from both above and below. Eliminating the need for rivets reduces the cost of the carrier assembly.

Figure 9:
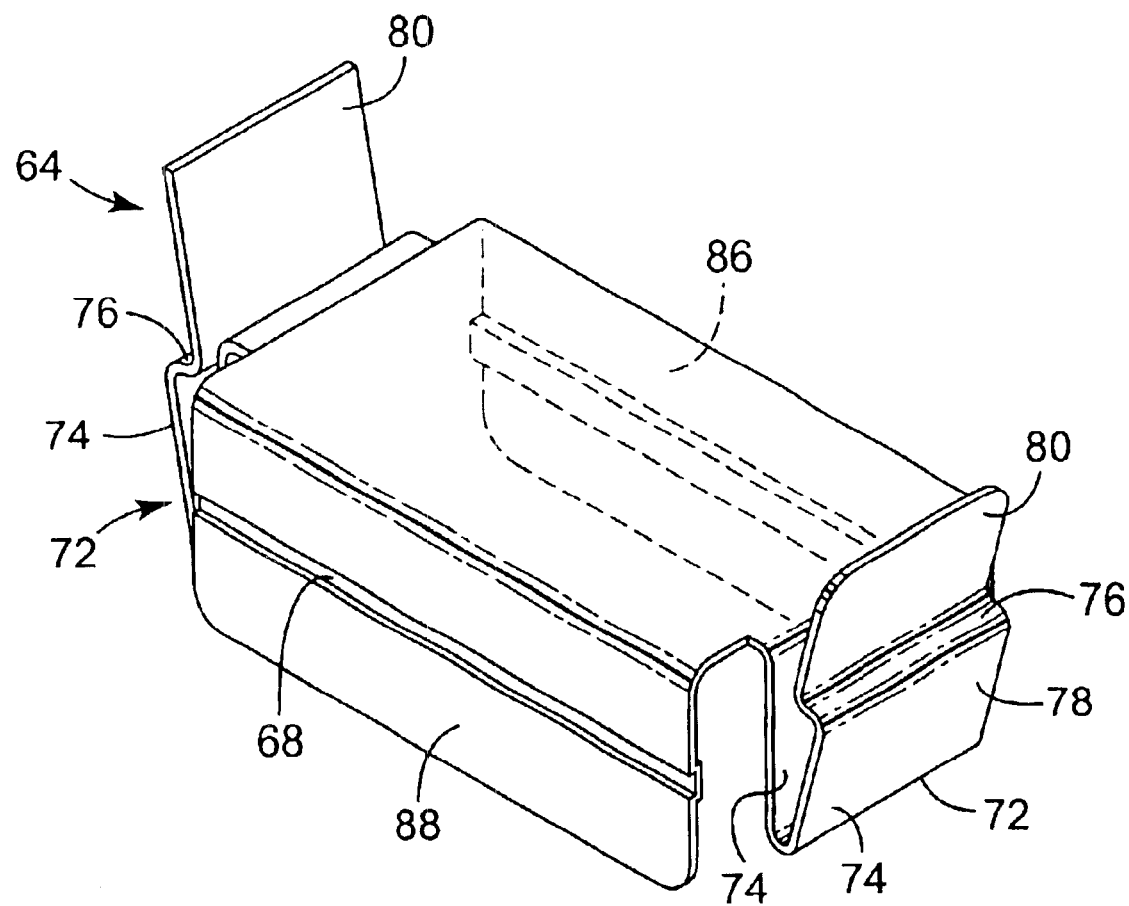
FIG. 9 shows a perspective view of a third embodiment of a connector clip according to the principles of the present invention.

As an alternative to any type of permanent attachment of the connector clip 64 to the carrier member, the connector clip 64 may snap on to both carriers as shown in FIG. 9. Such a dual snap construction will further reduce manufacturing costs, but could introduce additional assembly steps and disassembly problems in the field. All of these alternatives avoid the use of adhesives or tapes (which can degrade over extended times in harsh environmental conditions), or other types of mechanical fasteners such as screws or nuts and bolts (which can increase assembly time).

Figure 6:
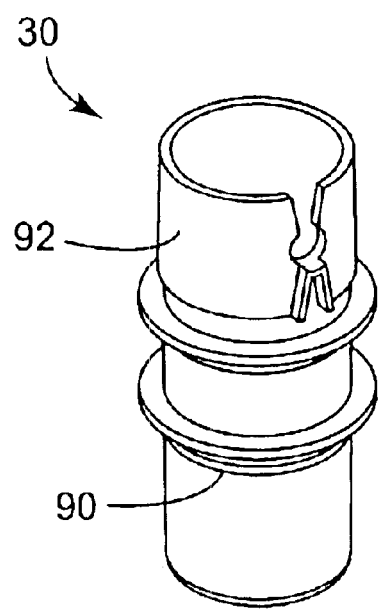
FIG. 6 shows a perspective view of the sensor of FIGS. 1–2.
Figure 7:
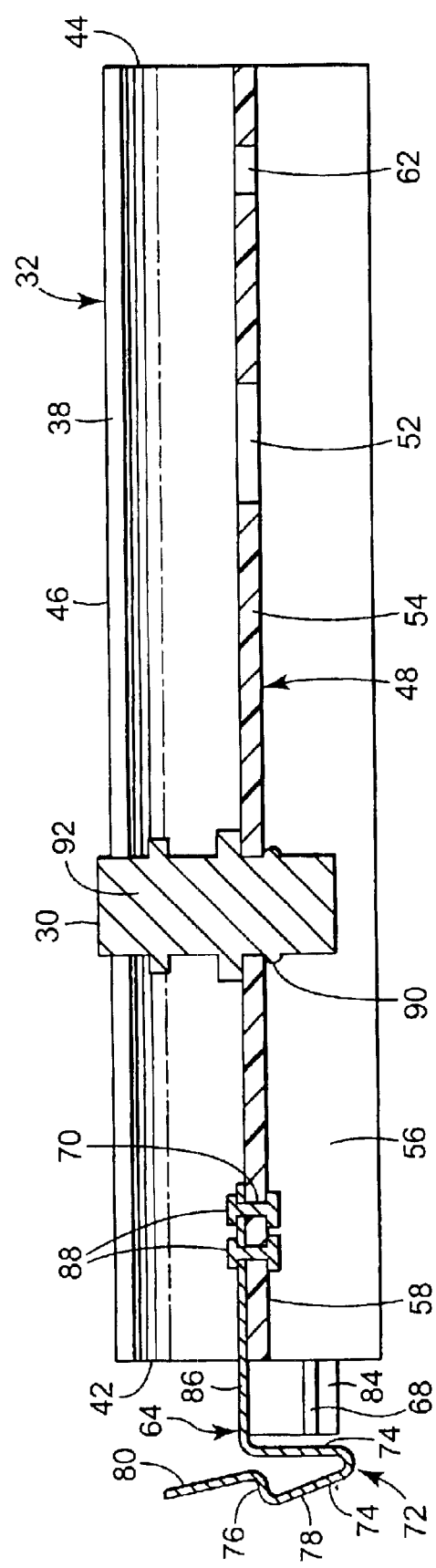
FIG. 7 shows a cross-sectional view of a probe carrier support section, connector clip and sensor taken along lines 7—7 of FIG. 2.

While the present invention is in no way limited to the type of sensor probe 30 used, the present invention further contemplates structures for readily attaching and detaching the sensor probe 30 to the carrier section 32. As best shown in FIGS. 6 and 7, the sensor probe 30 includes an interference ridge 90. The interference ridge 90 is sized and spaced to mate with the sensor openings 52 in the horizontal wall 54. In the preferred embodiment, the sensor opening 52 is sized with a slight clearance such as 0.012 inches in diameter greater than the outer diameter of the sensor probe 30, and the interference ridge 90 is then sized at an increased diametrical thickness of 0.016 inches relative to the outer diameter of the sensor probe 30, causing a 0.004 inch interference during insertion of the sensor probe 30 into the sensor opening 52. The preferred interference ridge 90 extends axially for a length of 0.043 inches along the sensor probe 30.

Each sensor probe 30 is pressed into its sensor opening 52 from above. Once the interference ridge 90 passes fully through the sensor opening 52, the sensor probe 30 seats in the sensor opening 52 with a strong positive mechanical attachment which provides a tactile click. Because only a push force and no pull force is used to seat the sensor probe 30, the likelihood of damage to the sensor probe 30 during the seating process is minimized. The tactile click obtained when the sensor probe 30 is fully seated further minimizes the possibility of damage due to too large of a compression force pushing the sensor probe 30 into the sensor opening 52. Such possibility of pulling damage or over-pushing damage are particularly to be avoided in that the attachment of the sensor probe 30 to the carrier section 32 is commonly performed in the field during installation of the system 20 and under diverse weather and environmental conditions, as contrasted from assembly in a controlled assembly plant environment.

The preferred sensor probe 30 has a housing body 92 molded of generally rigid plastic, such as ABS. As a molded article, the tolerance of the interference ridge 90 can be closely maintained.

Assembly and placement of the probes 30 and the vehicle sensing system 20 is even more easily accomplished and simple than with the system of U.S. Pat. No. 5,850,192. Once the bore is formed and a conduit 24, if used, is inserted, the support structure 36 and the probes 30 are placed. To begin insertion, the first carrier section 32 is placed into the hand hole 26 and linearly aligned to the conduit 24. The first sensor probe 30 is inserted from above into a sensor mounting hole 52 in the carrier section 32. The installer presses the sensor probe 30 downward until a tactile click is registered, verifying that the sensor probe 30 is fully seated. The associated wiring cable 31 (if any) for the sensor probe 30 is fed backward toward the open (trailing) end 44. If desired, a retrieval line 94 may be connected to the first carrier section 32 and extended backward. When this step has been completed, the carrier section 32 in its linear alignment with the conduit 24 is pushed forward and slid into the conduit 24 until sufficient room in the hand hole 26 for a next carrier section 32.

The next carrier section 32 is placed downward onto the first carrier section 32, aligned so that the prong 72 of the connector clip 64 engages downwardly into the clip recess slot 62 in the horizontal wall 54 of the first carrier section 32. The installer presses the next carrier section 32 downwardly until the clip prong 72 springs outward into engagement with the slot 62 and the spring action registers a tactile click perceived by the installer that the two carrier sections 32 are fully clipped together. Considering that this attachment will necessarily occur within the hand hole 26, the use of only downward force is much simpler for the installer than pulling upward. The second carrier section 32 is pushed forward into the conduit 24 and the attachment/assembly process is continued by the installer.

The wiring 31 of the sensor probe(s) 30 is placed through the open top 50 of the second carrier section 32 and the retrieval line 94 is also placed over the open top 50 in the carrier section 32. If spacing to achieve a desired detection coverage area dictates that another probe 30 should be placed in a carrier section 32, the probe 30 is inserted into one of the mounting holes 52. Typically, an additional sensor probe 30 will be used for each lane of traffic being monitored. When this step has been completed, the connected carrier sections 32 are pushed forward into the conduit 24. As additional carrier sections 32 are attached, the extended support train 36 grows in length. This process is repeated until an extended support train 36 is assembled with sufficient carrier sections 32 aligned in an end-to-end configuration within the conduit 24 so that the sensor probes 30 are positioned at their predetermined sensing locations beneath the roadway 22.

Typically, each sensor probe 30 will be centered beneath the lane of traffic being monitored. If desired, the distance to the endmost sensor probe 30 may be measured above ground from the hand hole 26 to the desired center-of-lane position, and sufficient support carrier sections 32 may be assembled until the end probe 30 is placed at the proper, measured position beneath the roadway 22. The distance back from which a sensor probe 30 needs to be placed from the first carrier section 32 may be marked on the retrieval line 94 or on the wiring 31 and a probe 30 inserted into the carrier section 32 proximate each pre-measured position. In this manner, easy installation is provided for following placement of the first endmost probe 30.

To properly align the sensor probe(s) 30 in vertical orientation, the installer will take the exposed carrier section 32 (the most recently installed carrier section 32) and twist it in either a clockwise or counter-clockwise direction about the longitudinal axis of the conduit 24. Adjustment is achieved by creating a pulling, pushing, or twisting in a clockwise or counterclockwise motion, or any combination thereof to align the sensors 30 inside the conduit 24 as necessary. The connector clips 64 need to be capable of withstanding this twisting force without separating from the individual carrier sections 32. The retention slot/tab attachment between the connector clips 64 and the carrier sections 32 is quite robust, and greatly diminishes the occurrence of having a connector clip 64 separate from its carrier section 32 during use. Because each connector clip 64 is preferably attached to its carrier sections 32 along two or three planes, when the linked carrier sections 32 are torqued about the longitudinal axis by the installer, the connector clips 64 do not bend but remain rigidly attached to the carrier sections 32. This design of the connector clips 64 minimizes the amount of torsional or rotational play between linked carrier sections 32, so all the sensor probes are equivalently aligned and rotation of the last carrier section 32 about its longitudinal axis equivalently rotates all of the attached carrier sections 32 in the extended support train 36. If desired, a cradle clip (not shown) may finally be used to secure the angular orientation of the connected carrier sections 32 and sensor probes 30 within the conduit 24 and at the substantially vertical orientation relative to the longitudinal axis of the conduit 24. As a final step, the wiring 31 is then fed to the proper processors for data analysis, which may either be placed at the hand hole 26 or placed remotely therefrom.

In an ideal world, the system 20 of the present invention is installed prior to laying the roadway 22. Prior to creation of the roadway 22, the system 20 can be installed and the flatness of the conduit 24 can be measured and maintained quite precisely. The result is a conduit 24 under the roadway 22 which is very straight, flat and clean. However, many roadways 22 were created before the need to monitor traffic was determined, and the system 20 of the present invention is commonly useful in monitoring traffic traveling on such pre-existing roadways 22. When the roadway 22 is pre-existing, conduit 24 is bored horizontally into place under the roadway 22 by use of a hydraulic ram. However, horizontal boring is not as accurate as the preconstruction open trench system, and the result is a conduit 24 which may bend along its length. Similarly, a slight bend radius may occur because continuous conduit is supplied to the installation crews on large rolls or spools, and the conduit may take a natural curl or bend from its previous spool wrapping.

The design of the present invention particularly contemplates use with conduits 24 which include such a bend. The connector clip 64 is attached to the carrier body 38 such that the prong 72 extends beyond the (leading) end 42 of the carrier body 38 for a sufficient distance so as to maintain limited separation between adjacent aligned bodies 38 connected by the connector clip 64. In particular, the length of the connector clip 64 of the present invention is slightly longer than the corresponding length between attachment points on the two carrier sections 32 as shown in FIG. 10, such that the attached carrier sections 32 have a slight gap 96 between them. The leading carrier section 32 has the same cross-sectional shape at its trailing end 44 as the cross-sectional shape of the trailing carrier section 32 at its leading end 42. The slight gap 96 permits a limited amount of pivoting between attached carrier sections 32. In the preferred embodiment, a designed gap 96 of about 0.10 inches allows pivoting of up to 5 to 15°. This allows the attached carrier sections 32 to negotiate a bend in the conduit 24 which corresponds in amount of bend and severity of bend to the associated radius of curvature created by 5 to 15° angles between rigid attached carrier sections 32. A gap larger than 0.10 inches may allow even greater flexibility. While the preferred connection clip attachment permits this pivoting, it still prevents significant torsional or rotational play. The cross-sectional shape of the preferred carrier design can thus accommodate larger variations in the flatness and bend of the buried conduit run than could be accommodated by the prior art. As carrier sections 32 are inserted into the conduit 24, the extended support train 36 bends slightly so the sides of the carrier sections 32 do not get caught on the conduit joints or bind against the conduit inner diameter.

Rocks and other debris can become trapped in the conduit 24. The open bottom 60 under the carrier section 32 provides for a place for rocks and other debris to position themselves as the carrier sections 32 are inserted into the conduit 24. Problems associated with blowing rocks and other debris out with compressed air or pulling them out are avoided.

Should maintenance or adjustment be required, such as in the event a faulty sensor probe 30 needs to be replaced, the present invention provides great benefits over the prior art. The extended support train 36 can be pulled outward toward the hand hole 26 by pulling on the last carrier section 32 or by pulling the carrier sections 32 back with the retrieval line 94. Once a carrier section 32 is sufficiently within the hand hole 26 to permit access to the thumb tab 80, the worker depresses the quick release thumb tab 80 without the aid of additional tools and pulls the carrier section 32 upward, unclipping the end most carrier section 32 from the next adjacent carrier section 32. The quick release thumb tab 80 acts as a lever to provide for a large moment force which is used to overcome the spring force of the prong 72. Note that the quick release thumb tab 80 detaches by pressure in a direction out of the conduit 24, so there is no danger that the thumb tab 80 will catch on the conduit 24 and release during pulling the extended support train 36 from the conduit 24. The thumb-sized release tabs 80 require less worker applied force and allow the worker to readily separate adjacent carrier sections 32 when desired.

The sensor probes 30 can also be much more readily removed from the carrier sections 32 than was possible with the prior art. The worker can either pull the extended support train 36 sufficiently from the conduit 24 that the sensor probe 30 is within the hand hole 26 or completely remove the sensor carrying carrier section 32 from the hand hole 26. The worker then rotates the carrier section 32 upside down (i.e., generally 180° about its longitudinal axis). The worker then pushes downwardly on the sensor probe 30 so as to move the interference ridge 90 through its sensor probe opening 52, thereby removing the sensor probe 30 from the carrier section 32. The worker then rotates the carrier section 32 back to its upright orientation. At this point, either a new sensor probe 30 (if the sensor probe 30 malfunctioned) can be pushed downward into position in the carrier section 32, or the same sensor probe 30 (if the sensor probe 30 was improperly positioned) can be pushed downward into a different sensor opening 52. Once the sensor probe 30 is received back in place with the desired tactile click, the worker slides the support structure into the conduit 26 a sufficient distance to position the sensor probe 30 in its desired location relative to the roadway 22. Thus, the inventive method applies only direct pressure on the sensor probes 30. Workers are not frustrated either with the difficulty of removing a sensor probe 30 from its carrier section 32 or with uncertainty as to whether the sensor probe 30 is sufficiently seated. Most importantly, the workers are not tempted to pull the sensor probe 30 by its cable 31 and damage the cable 31 or sensor probe 30 during installation. If the worker so chooses, the entire sensor probe removal and insertion process can be accomplished within the hand hole 26, with the worker applying only downward forces.

It is to be understood, however, that even though numerous characteristics and advantages of the present invention have been set forth in the foregoing description, together with details of the structure and function of the invention, the disclosure is illustrative only. Workers skilled in the art will recognize that changes may be made in form and detail without departing from the spirit and scope of the invention.

What is claimed is:

1. A system for detecting vehicles on a vehicle travel surface, comprising:
    a plurality of support carrier sections adapted for insertion followed by aligned attachment and sliding within a conduit extending under the vehicle travel surface, each support carrier section comprising:
        a body which is substantially rigid running longitudinally from a first end to an opposing second end, the body having:
            a left clip abutment wall extending vertically, a right clip abutment wall extending vertically and a horizontal clip abutment wall extending horizontally and integrally between the left and right clip abutment walls; and
            a retention groove extending horizontally in the left and right clip abutment walls;
        a clip recess defined in the body adjacent the first end of the body;
        a clip adjacent the second end of the body, the clip having a prong which deflects against a spring force to be tactilely receivable in the clip recess of a next aligned support carrier section; and
        a release lever for the clip, the release lever extending upwardly and exposed for manual depression to overcome the spring force and move the prong to a release position relative to the clip recess; and
        tabs on the clip, the tabs engaged with the retention grooves on the left and right clip abutment walls.

2. The system of claim 1, further comprising:
    at least one sensor probe releasably attachable to the body.

3. The system of claim 2, wherein each body includes a sensor opening defined in the body for receiving and holding a sensor probe, wherein the sensor probe includes an interference ridge tactilely receivable in the sensor opening.

4. The system of claim 2, wherein each body includes a sensor opening defined in the body for receiving and holding a sensor probe inserted from above, and wherein the body allows access to the sensor probe from below to push the sensor probe upward relative to the body and remove the sensor probe from the sensor opening.

5. The system of claim 1, wherein the clip includes a downwardly directed ramp surface, the ramp surface interacting with the clip recess of a preceding body to place a gradually increasing force overcoming the spring force of the clip when the clip is pressed downward into the clip recess from above.

6. The system of claim 1, wherein each body has a consistent cross-sectional shape, wherein the clip is separately formed from the body and attached to the body, and wherein the clip extends beyond the second end of the body for a sufficient distance so as to maintain limited separation between adjacent aligned bodies connected by the clip.

7. The system of claim 6, wherein the attached clip and the limited separation permit limited pivoting movement of an attached body relative to a preceding body.

8. The system of claim 1, wherein the release lever is a thumb lever.

9. A system for detecting vehicles on a vehicle travel surface, comprising:
    a plurality of support carrier sections adapted for insertion followed by aligned attachment and sliding within a conduit extending under the vehicle travel surface, each support carrier section comprising:
        a body which is substantially rigid running longitudinally from a first end to an opposing second end, the body having;
            a left clip abutment wall extending vertically;
            a right clip abutment wall extending vertically; and
            a horizontal clip abutment wall extending horizontally and integrally connected between the left clip abutment wall and the right clip abutment wall; and
        a retention groove extending horizontally in the left and right clip abutment walls;
        a clip recess defined in the body adjacent the first end of the body;
        a clip attached to the body on multiple surfaces, the clip having a prong adapted to be received in the clip recess of an adjacent support carrier section for attachment of adjacent support carrier sections, and tabs for engagement with the retention grooves on the left and right abutment walls.

10. The system of claim 9, wherein the clip comprises:
    a left body abutment wall attached to the left clip abutment wall of the body;
    a right body abutment wall attached to the right body abutment wall of the body; and
    a horizontal body abutment wall extending horizontally and integrally connected between the left body abutment wall and the right body abutment wall and in contact with the horizontal clip abutment wall;
such that the attachment between the clip and the body minimizes rotational play between the clip and the body about a longitudinal body axis.

11. The system of claim 10, wherein clip extends beyond the second end of the body for a sufficient distance so as to maintain limited separation between adjacent aligned bodies connected by the clip, wherein the attached clip and the limited separation permit limited pivoting movement of an attached body relative to a preceding body.

12. A method of adjusting a relative location of a sensor probe in a system for detecting vehicles on a vehicle travel surface, the system comprising:
    a support structure extending along a longitudinal axis within a conduit extending under the vehicle travel surface;

a plurality of sensor probe openings in spaced locations defined within the support structure; and a sensor probe positioned within one of the sensor probe openings so as to be upwardly directed at a first location relative to the vehicle travel surface;

the method comprising:

removing the support structure from the conduit a sufficient distance to permit access to the sensor probe;

pushing on the sensor probe so as to remove the sensor probe from its sensor probe opening;

pushing on the sensor probe so as to insert the sensor probe in a different sensor probe opening; and sliding the support structure within the conduit a sufficient distance to position the sensor probe in a second location relative to the vehicle travel surface.

13. The method of claim 12, further comprising:

prior to removing the sensor probe from its sensor probe opening, rotating the support structure about its longitudinal axis so the sensor probe is downwardly directed, such that the pushing force removing the sensor probe is downwardly directed.

14. The method of claim 13, further comprising:

after removing the sensor probe from its sensor probe opening, rotating the support structure about its longitudinal axis to its original orientation, such that the pushing force inserting the sensor probe in a different sensor probe opening is downwardly directed.

15. The method of claim 14, wherein the sensor probe includes an interference ridge tactilely receivable in the sensor opening, such that inserting the sensor probe in the different sensor probe opening is accomplished with a tactile click.

16. The method of claim 12, wherein the support structure allows access to the sensor probe from below to push the sensor probe upward and remove the sensor probe from the sensor opening.

17. The method of claim 12, wherein the support structure comprises:

a plurality of support carrier sections, each support carrier section comprising:

a body which is substantially rigid running longitudinally from a first end to an opposing second end;

a clip recess defined in the body adjacent the first end of the body;

a clip adjacent the second end of the support carrier section, the clip having a prong which deflects against a spring force to be tactilely receivable in the clip recess of a next aligned support carrier section; and a release lever for the clip, the release lever exposed for manual depression to overcome the spring force and move the prong to a release position relative to the clip recess;

wherein the removing act comprises repeated acts of:

pulling the support structure a sufficient distance out of the conduit to permit access to a next release lever; and depressing the accessed release lever and thereby disattaching a support carrier section from the remaining support structure.

18. A method of manufacturing a support carrier section for use in a system for detecting vehicles on a vehicle travel surface, the method comprising:

forming a support carrier section body which is substantially rigid running longitudinally from a first end to an opposing second end, the support carrier section having clip attachment area which is open and accessible from a first direction and from a second direction opposing the first direction and having horizontally extending clip retention grooves therein;

placing a clip into the clip attachment area from the first direction; and attaching the clip to the support carrier section body from the second direction.

19. The method of claim 18, wherein attaching act the clip to the support is performed using a rivet applied from the second direction.

20. The method of claim 18, wherein the clip attachment area is a planar horizontal wall, and wherein the first direction is from above horizontal wall and the second direction is from below the horizontal wall.

21. The method of claim 20, wherein the support carrier section body is formed with a horizontal wall extending between a left runner and a right runner, and wherein both the left runner and the right runner extend both above and below the horizontal wall, and wherein both the left runner and the right runner are formed with an arcuate outer shape.

\* \* \* \* \*